(12) United States Patent
Yamada (10) Patent No.: US 6,473,537 B1
(45) Date of Patent: Oct. 29, 2002

(54) PROCESS AND SYSTEM FOR DETECTING BEND ANGLE

(75) Inventor: Yukihiro Yamada, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/343,256

(22) Filed: Jun. 30, 1999

(30) Foreign Application Priority Data

Feb. 7, 1998 (JP) ............................................. 10-187340

(51) Int. Cl.$^7$ ................................................. G06K 9/36
(52) U.S. Cl. ................................... 382/286; 382/152
(58) Field of Search ................................. 382/286, 141, 382/151, 152, 218, 222; 348/87, 88, 92

(56) References Cited

U.S. PATENT DOCUMENTS

| | | | | |
|---|---|---|---|---|
| 4,845,763 A | * | 7/1989 | Bandyopadhyay et al. | .... 382/8 |
| 5,329,597 A | * | 7/1994 | Kouno et al. | ................... 382/8 |
| 5,633,950 A | * | 5/1997 | Yamaoka et al. | ........... 382/141 |
| 5,899,964 A | * | 5/1999 | Ooenoki et al. | ............ 702/150 |
| 6,163,374 A | * | 12/2000 | Otani et al. | ............... 356/152.1 |

FOREIGN PATENT DOCUMENTS

| | | |
|---|---|---|
| JP | 4-18926 | 3/1992 |
| JP | 7-239221 | 9/1995 |

* cited by examiner

*Primary Examiner*—Yon J. Couso
(74) *Attorney, Agent, or Firm*—Armstrong, Westerman & Hattori, LLP.

(57) ABSTRACT

A process and system capable of accurately extracting the image of a light ray projected onto a workpiece from various images even if the projected light image formed on the workpiece is short in length. A first picture image picked up prior to bending of the workpiece W and a second picture image picked up after completion of the bending operation are respectively assigned to XY pixels, and these pixels are divided into two groups according to whether each pixel is assigned either of the picture images, thereby obtaining images a and b. Each pixel of the image a is compared to its corresponding pixel of the image b, these pixels having the same coordinate value, and logical operation is performed based on a logical operation table. In this way, a pixel image (image c) which corresponds to the projected light image formed on the workpiece only can be extracted.

6 Claims, 8 Drawing Sheets

IMAGE a
FIG.6(a)

IMAGE b
FIG.6(b)

IMAGE c
FIG.6(c)

PROCESS AND SYSTEM FOR DETECTING BEND ANGLE

TECHNICAL FIELD

The present invention relates to a process and system for detecting a bend angle when bending a sheet-like workpiece to a desired angle.

BACKGROUND ART

One known bend angle detection system adapted for use in a bending machine such as press brakes is disclosed in Japanese Patent Publication Gazette (KOKAI) No. 7-239221 (1995). According to this publication, a slit light or a plurality of spot lights are projected onto a surface of a workpiece to form a light image thereon and the picture image of the light image is picked up by a pickup means to be subject to image processing, whereby the angle of a bend in the workpiece is detected.

In this bend angle detection system, a picture image picked up by the pickup means is digitized with an appropriate threshold to form a binary image, using a known image processing technique, the binary image is thinned to have one pixel width, and then the thinned straight line having one pixel width is represented by a sequence of points (x, y), treating one pixel as a unit. From this image composed of a sequence of points, a linear equation ax+by+c=0 is calculated, using the least squares method or the like. If the length of the straight line obtained from the calculation exceeds a specified value (e.g., one half the length of the screen), this straight line is determined as the points on the workpiece to be extracted. Then, the inclination and position of this straight line on the screen are calculated, from which the angle of a bend in the workpiece is determined.

The above publication also discloses a straight line extraction system for extracting only necessary straight lines formed on an image in cases where a workpiece has a plurality of bends. In this system, a slit light is projected onto the outer surface of a bent workpiece and this light also falls on a part of a lower die, so that the lower die is included within the view of the pickup means, and a picture image picked up by the pickup means under such a condition is represented as a sequence of points (x, y) as noted earlier. Then, a pattern composed of several straight lines is extracted from the sequential point image thus obtained and the second straight line which leads to a straight line resting on the lower end of the screen is taken out, whereby a desired straight line can be extracted.

Another prior art bend angle detection system is disclosed in Japanese Patent Publication Gazette (KOKOKU) No. 4-18926 (1992) according to which, a pickup device is positioned on a side of the dies and data on a picture image picked up in a state in which a workpiece (sheet material) has not been fed to a bending machine is stored in an A memory, while data on a picture image picked up in a state in which a workpiece has been fed to the bending machine is stored in a B memory. The picture image data are respectively converted into binary signals and these signals undergo a subtraction process, thereby obtaining image data on the workpiece based on which the angle of a bend in the workpiece is detected.

However, the bend angle detection system of Japanese Patent Publication No. 7-239221 reveals the following problem. Concretely, when detecting a bend angle of a workpiece having a short leg, two line segments, that is, the image of a light ray projected onto the workpiece and the image of a light ray projected onto the punch (upper die) are recognized. Since the image of the light ray projected onto the workpiece is shorter than a desirable specified length because of the short leg of the workpiece, the projected light image formed on the punch is mistakenly recognized as a line segment to be measured, which results in a failure in bend angle detection.

In the case of the above straight line extraction system which extracts necessary straight image lines only, if the lower die has a level difference, two line segments will be taken as the projected light image formed on the lower die, so that the projected light image on the lower die is mistakenly recognized as a line segment to be measured. If the workpiece is a wavy galvanized plate, a plurality of lines or one straight line is extracted as the projected light image formed on the workpiece so that the projected light image on the workpiece cannot be correctly picked up. If the boundary between the projected light image on the lower die and one on the workpiece is indefinite, it is difficult to extract the straight lines to be measured so that there occur troubles such as extraction of a pattern composed of only one straight line.

The bend angle detection system disclosed in Japanese Patent Publication No. 4-18926 which is a prior art system associated with the present invention is intended for pickup of the image of an actual bending position in a workpiece and designed to obtain image data on a side of a workpiece by subtraction of a background (such as dies) which is supplied with no workpiece. Therefore, the technical concept of this system is different from that of the present invention which is intended for accurate extraction of a projected light image formed on a workpiece.

The present invention is directed to overcoming the foregoing problems and the primary object of the invention is therefore to provide a bend angle detection system and bend angle detection process which are capable of accurately extracting a projected light image formed on a workpiece from various images even if the projected light image formed on the workpiece is short in length.

DISCLOSURE OF THE INVENTION

According to a first aspect of the invention, the above object can be achieved by a bend angle detection process in which a linear projected light image is produced on a surface of a workpiece, a picture image of the linear projected light image is picked up and subject to image processing, thereby detecting the angle of a bend in the workpiece, the process comprising:

(a) a first step of picking up a picture image of a first linear projected light image during bending of the workpiece;

(b) a second step of picking up a picture image of a second linear projected light image after an elapse of a specified time period after picking up the picture image of the first linear projected light image;

(c) a third step of assigning the respective picture images picked up at the first step and at the second step to pixels arranged within a common plane represented by X and Y coordinates and dividing the pixels into two groups according to hue and brightness;

(d) a fourth step of creating a new picture image through logical operation which is performed by making comparison between each pixel associated with the picture image picked up at the first step and its corresponding pixel associated with the picture image picked up at the second step in the common plane represented by X and Y coordinates; and (e) a fifth step of calculating the angle of the bend from the new picture image created in the fourth step.

In the process designed according to the first aspect of the invention, at the first step, a picture image of a first linear projected light image formed on a workpiece surface is picked up during bending operation. At the second step, a picture image of a second linear projected light image is picked up after an elapse of a specified time period after picking up the picture image of the first linear projected light image. Then, the picture images picked up at the first step and at the second step are respectively assigned to pixels arranged in a common plane represented by X and Y coordinates and these pixels are divided into two groups according to hue and brightness.

Thereafter, logical operation is performed by making a comparison between each pixel associated with the picture image picked up at the first step and its corresponding pixel associated with the picture image picked up at the second step within the common plane represented by X and Y coordinates. In this logical operation, the pixels associated with both of the picture images picked up at the first and second steps are eliminated from the pixels associated with the picture image picked up at the second step, so that a new picture image is created. More specifically, the logical operation is performed such that the first linear projected light image is compared to the second linear projected light image to create a new picture image which constitutes only an image which has moved (i.e., only the projected light image formed on the workpiece W). Based on the new picture image thus created, the angle of a bend in the workpiece is calculated.

According to the process of the invention, the image moving during bending of the workpiece, that is, the linear projected light image formed on the workpiece which is the object of measurement can be extracted alone. With this arrangement, even if the workpiece surface is not flat, the projected image formed on the workpiece surface can be accurately extracted, resulting in accurate detection of the angle of a bend in the workpiece.

Preferably, the picture image of the first linear projected light image is picked up prior to bending operation while the picture image of the second linear projected light image is picked up after completion of bending operation. With this arrangement, only the projected light image formed on the workpiece can be extracted after completion of bending operation, through pickup of two picture images and image processing, which allows, as a result, accurate detection of the angle of a bend in the workpiece.

In the process of the invention, it is preferable to repeatedly pick up the picture images of the first linear projected light image and the second linear projected light image at specified time intervals during bending operation and to create a new picture image each time the picture images of the first and second linear projected light images are picked up. Even if other objects than the workpiece move during bending operation, the moving speeds of the objects are slower than that of the workpiece so that they are considered not to have moved on the basis of the above time interval at which the picture images are picked up. Therefore, this arrangement enables it to extract, with higher accuracy, a pixel image corresponding to only the projected image formed on the workpiece W and to provide more accurate bend angle detection.

According to a second aspect of the invention, there is provided a bend angle detection system which implements the bend angle detection process according to the first aspect of the invention. This system is provided with light projector means for projecting a light ray to produce a linear projected light image on a surface of a workpiece, and pickup means for picking up a picture image of the linear projected light image produced on the workpiece surface, the system further comprising:

(a) a first memory for storing a picture image of a first linear projected light image formed on the surface of the workpiece by the light projector means during bending operation, the picture image being picked up by the pickup means and;

(b) a second memory for storing a picture image of a second linear projected light image, the picture image being picked up after a specified time has elapsed after picking up the picture image of the first linear projected light image;

(c) a logical operation unit for respectively assigning the picture images of the first and second linear projected light images to pixels arranged in a common plane represented by X and Y coordinates, dividing these pixels into two groups according to hue and brightness, executing logical operation by making a comparison between each pixel associated with the first linear projected light image and its corresponding pixel associated with the second linear projected light image, these pixels having the same coordinates in the common plane;

(d) a third memory for storing a new picture image which has been created by the logical operation performed in the logical operation unit; and (e) a bend angle computing unit for calculating the angle of a bend in the workpiece from the new picture image stored in the third memory.

In the bend angle detection system of the invention, a picture image of a first linear projected light image which has been produced on the surface of a workpiece during bending operation is picked up, and then, a picture image of a second linear projected light image is picked up after an elapse of a specified time period after picking up the picture image of the first linear projected light image. The picture images of the first and second linear projected light images are stored in the first memory and the second memory respectively.

Subsequently, the respective picture images of the first and second linear projected light images are input to a logical operation unit and assigned to pixels arranged in a common plane represented by X and Y coordinates. These pixels are then divided into two groups according to hue and brightness. Thereafter, each pixel of the picture image of the first linear projected light image is compared to its corresponding pixel of the picture image of the second linear projected light image to perform logical operation, these pixels having the same coordinate value. A new picture image is created by eliminating the pixels associated with the picture images of the first and second linear projected light images and the pixels associated with the picture image of the first linear projected light image. Specifically, a new picture image constitutes an image (i.e., only the projected light image formed on the workpiece) which moved during the pickup of the picture image of the second linear projected light image after picking up the picture image of the first linear projected light image. This new picture image is stored in a third memory, according which, the angle of a bend in the workpiece is calculated by the bend angle computing unit.

Similarly to the first aspect, the second aspect enables extraction of only the image which moves during bending operation, that is, the linear projected light image formed on the workpiece (i.e., the object to be measured). Further, even if the surface of the workpiece is not flat, the projected light image on the surface of the workpiece can be accurately extracted. As a result, accurate bend angle detection can be attained.

In the system of the invention, the picture image of the first linear projected light image may be picked up prior to bending operation while the picture image of the second linear projected light image may be picked up after completion of bending operation. The picture images of the first linear projected light image and the second linear projected light image may be repeatedly picked up at specified time intervals during bending operation and a new picture image may be created each time the picture images of the first and second linear projected light images are picked up.

BEST MODE FOR CARRYING OUT THE INVENTION

Referring now to the drawings, a bend angle detection process and a bend angle detection system which embody the invention will be described.

(First Embodiment)

Figure 1A:
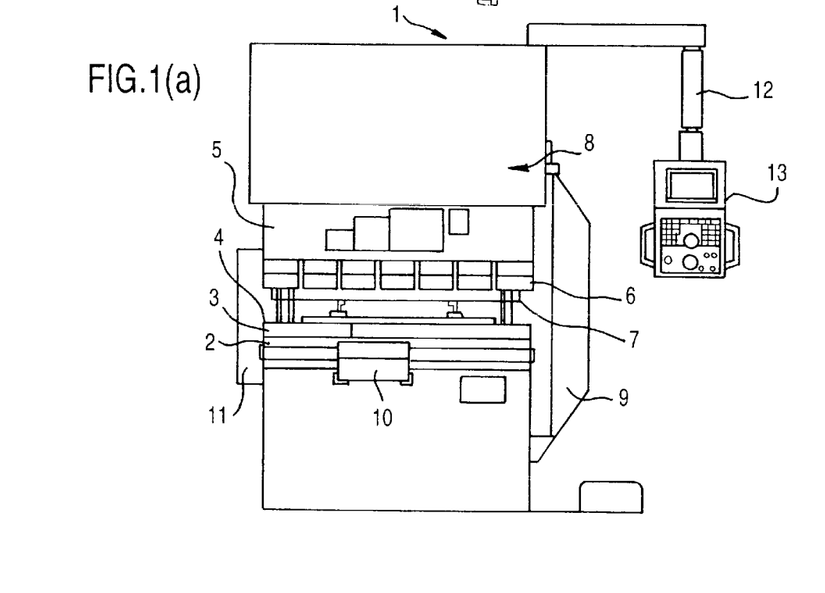
FIGS. 1(a), 1(b) and 1(c) are a front view, plan view and side view, respectively, of a press brake to which a bend angle detection system according to a first embodiment of the invention is applied.
Figure 1B:
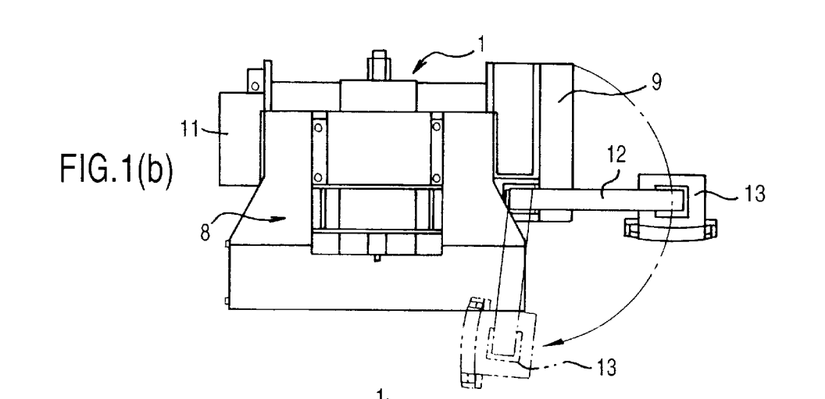
Figure 1C:
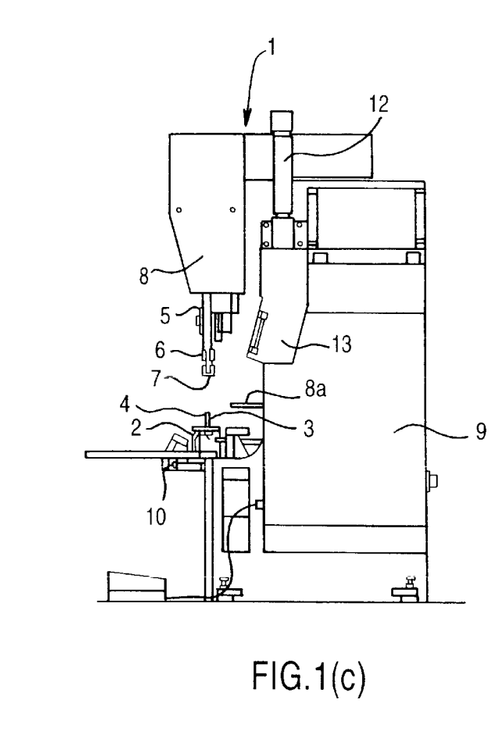
Figure 2:
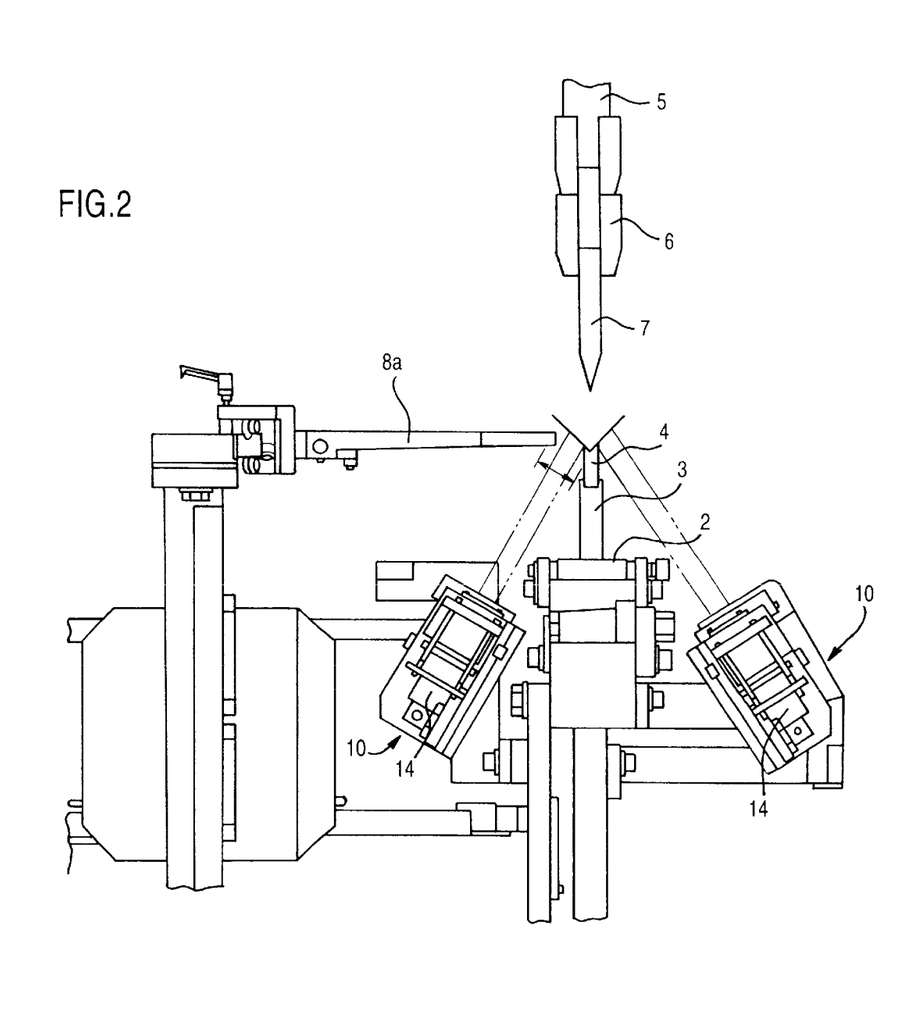
FIG. 2 is a partially enlarged side view of the press brake of the first embodiment.

FIGS. 1(a), 1(b) and 1(c) show a front view, plan view and side view, respectively, of a press brake to which a bend angle detection system according to a first embodiment of the invention is applied. FIG. 2 is a partially enlarged side view corresponding to FIG. 1(c).

In the present embodiment, a press brake 1 comprises a lower die (die) 4 securely supported by a die holder 3 disposed on a mount 2 and an upper die (punch) 7 that is arranged in opposing relationship with the lower die 4, being attached through a punch holder 6 to the underside of a ram 5 which is vertically movable above the punch 7.

The ram 5 is so supported as to be lifted and lowered by two drive units (not shown) which are positioned above the ram 5 and attached to a frame 8. Attached to one side of the frame 8 is a control panel 9 housing controllers such as servo amplifiers for controlling the above drive units. At the other side, there is provided an image processing unit 11 for processing a picture image input by image readers 10 (described later). Attached to the upper face of the frame 8 is a turnable arm 12 having a leading end to which an NC device 13 is attached for inputting and outputting workpiece bending data etc. and for calculating the angle of a bend based on the bending data.

In the above arrangement, a workpiece W made of a metal sheet is inserted between the punch 7 and the die 4 and bending of the workpiece W is performed by lowering the ram 5 to press the workpiece W placed on the die 4 with the punch 7 and the die 4. There is provided a backstop 8a which is positioned at the front face of the frame 8 behind the die 4. This backstop 8a allows one end of the workpiece W to come in contact therewith, thereby determining a bending position for the workpiece W. It should be noted that the projecting length of the backstop 8a is predetermined.

The image readers 10 are attached to the front and back parts of the mount 2 with the die 4 between. Each image reader 10 has a laser oscillator 14 and a CCD camera 15 (see FIG. 3) and a picture image of a slit light projected onto the workpiece W by the laser oscillator 14 is picked up by each CCD camera 15. The picture image picked up by each CCD camera 15 is input to the image processing unit 11.

Figure 3:
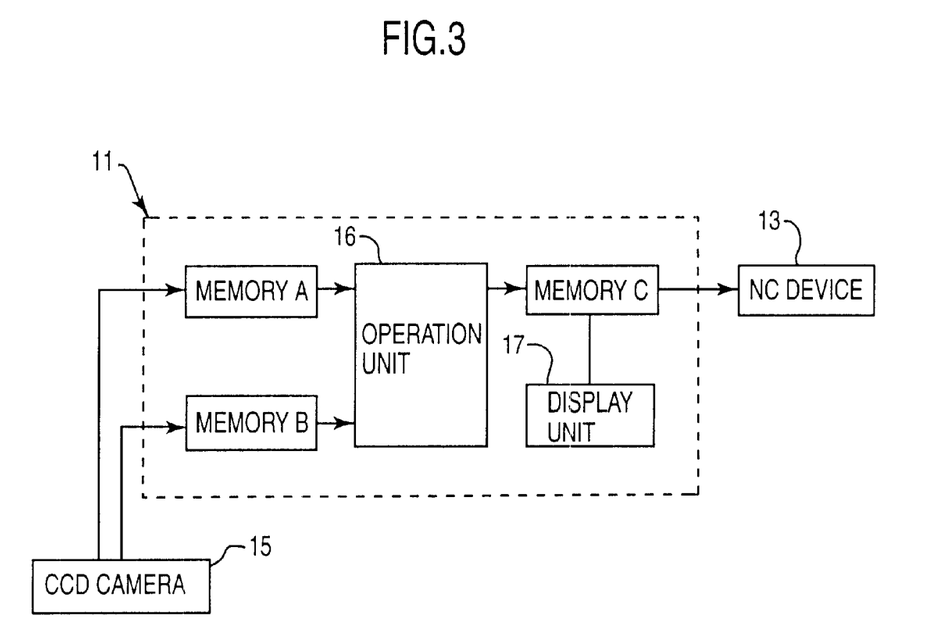
FIG. 3 is a block diagram of an image processing unit according to the first embodiment.

As shown in FIG. 3, the image processing unit 11 comprises (i) two memories A, B (which correspond to the first and second memories of the invention) for storing images picked up by the CCD cameras 15, (ii) an operation unit 16 for assigning the picture images stored in the memories A, B to pixels arranged in a common plane represented by X and Y coordinates and performing logical operation in which corresponding pixels in the plane are compared to each other, (iii) a memory C (which corresponds to the third memory of the invention) for storing image data which results from the operation performed by the operation unit 16, and (iv) a display unit 17 for displaying the image data stored in the memory C. The image data stored in the memory C is input to the NC device 13.

The NC device 13 comprises a bend angle computing unit (not shown) for calculating the angle of a bend based on the image data input from the memory C. Based on bend angle data from the bend angle computing unit, a lower limit for the ram 5 is calculated and a command for starting or stopping operation at a desired ram's position is released.

Figure 4:
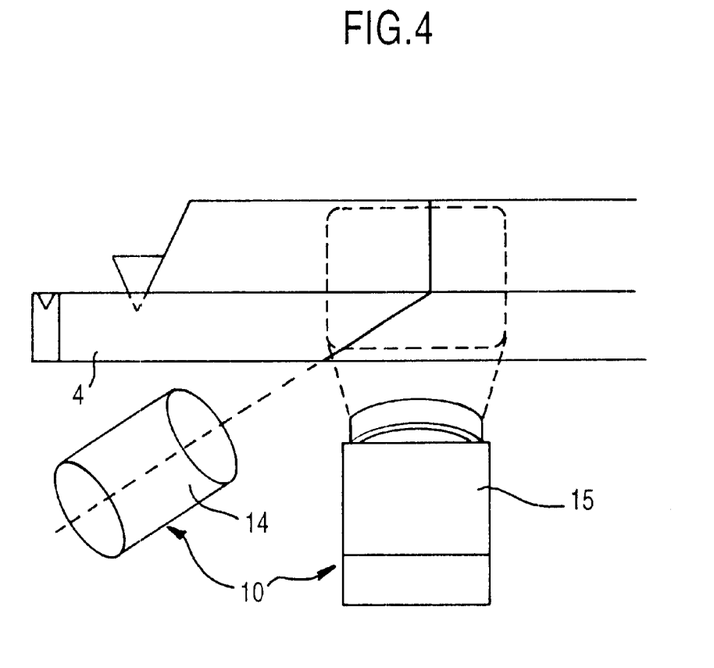
FIG. 4 is a schematic diagram of a workpiece surface and an image reader according to the first embodiment.

To detect the angle of a bend in the workpiece with the bend angle detection system having the above structure, as shown in FIG. 4 which schematically illustrates the workpiece surface on the side of the front face (or back face) of the die 4 and the image readers 10, a slit light is projected from each laser oscillator 14 onto the surface of the workpiece W and a picture image of this slit light is picked up by each CCD camera 15. If the die 4 on which the workpiece W is placed is high in level as shown in FIG. 4, a slit light may fall on the die 4 and this slit light may be brought within the view of each CCD camera 15 in some cases. Also, a slit light from the image reader 10 positioned on the side of the back face of the die 4 sometimes falls on the backstop 8a and this slit light may be caught within the view of the CCD camera 15.

Figure 5A:
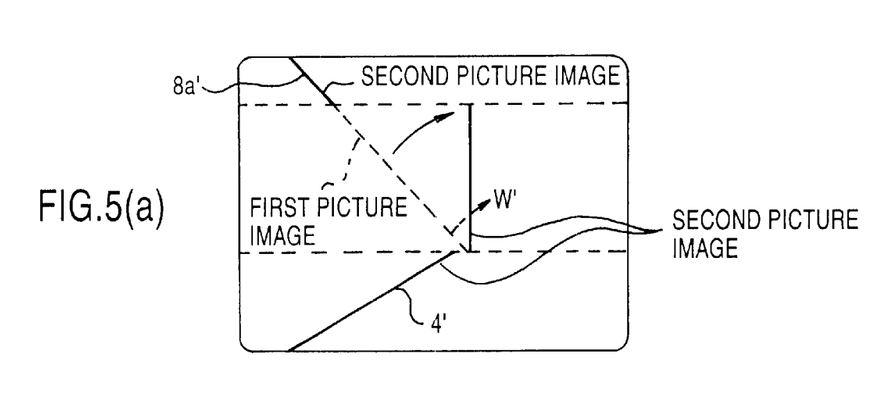
FIG. 5(a) is a diagram of a first picture image and second picture image according to the first embodiment, and FIG. 5(b) corresponds to FIG. 5(a) except that the first and second picture images are represented as XY pixels.

FIG. 5(a) shows, in the same screen, a first picture image picked up by the CCD cameras 15 prior to bending operation (note that the picture image of the light image on the workpiece W is indicated by broken line) and a second picture image (indicated by solid line) picked up after completion of the bending operation. As seen from this figure, the picture images 4', 8a' of the slit lights projected onto the die 4 and the backstop 8a, respectively, do not move while the picture image W' of the slit light projected onto the workpiece W moves as the bending operation proceeds. The first picture image and the second picture image are stored in the memories A and B, respectively.

Figure 5B:
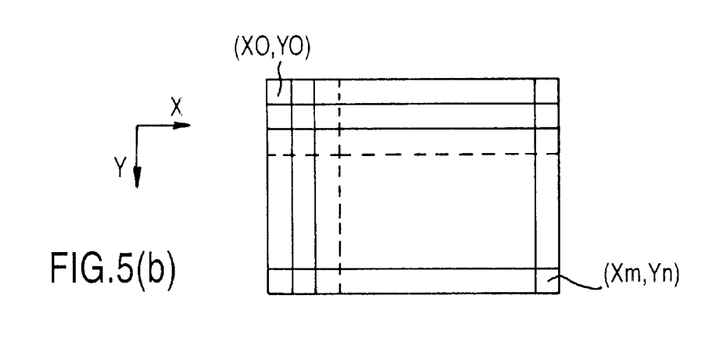
Figure 6A:
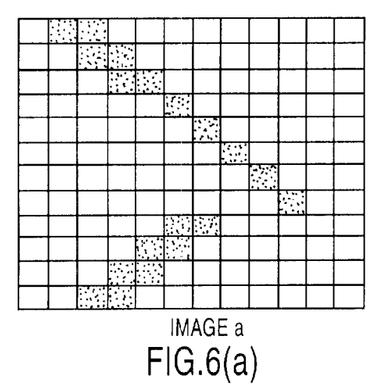
FIGS. 6(a), 6(b), 6(c) and 6(d) show an image a, image b, image c and logical operation table, respectively.
Figure 6B:
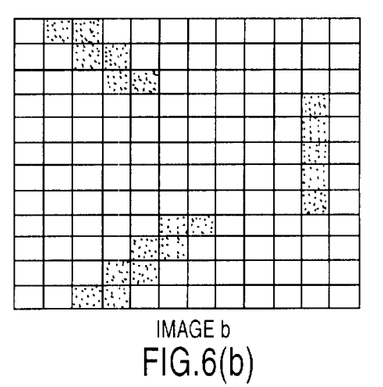

The first picture image stored in the memory A and the second picture image stored in the memory B are input to the operation unit 16. These picture images are respectively assigned to pixels (X0, Y0) . . . (Xm, Yn) within the plane represented by X and Y coordinates shown in FIG. 5(*b*) and these pixels are then divided into two groups according to whether each pixel is assigned either of the picture images. The pixel image (hereinafter referred to as "image a") associated with the first picture image and the pixel image (hereinafter referred to as "image b") associated with the second picture image, which are obtained after assigning these picture images to pixels (X0, Y0) . . . (Xm, Yn), are shown in FIGS. 6(*a*) and 6(*b*), respectively.

Figure 6C:
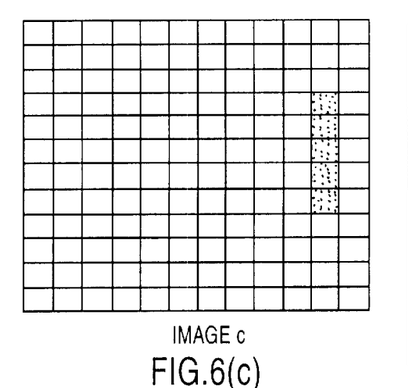
Figure 6D:
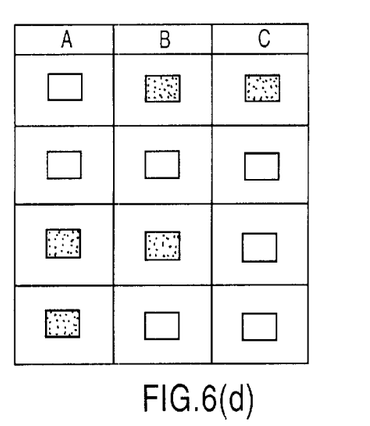

In the operation unit 16, each pixel of the image a and its corresponding pixel of the image b, which pixels have the same coordinate value, are compared to each other to perform logical operation and then, the pixel image (hereinafter referred to as "image c") (see FIG. 6(*c*)) corresponding to only the picture image which moved as bending of the workpiece W proceeded (i.e., the picture image of the workpiece W) is extracted. The logical operation is performed based on the logical operation table shown in FIG. 6(*d*). This logical operation table shows a result of arithmetic operation performed with a logical equation band (A nand B)=C (nand is exclusive AND, and A, B, C are pixels constituting the images a, b and c, respectively). In FIG. 6(*d*), a blank box indicates a portion having no pixel image (0) while a black box indicates a portion having a pixel image (1).

The image c thus obtained is input to and stored in the memory C and displayed on the display unit 17. The image c is also input to the NC device 13 as image data which is then converted into a straight line with a known image processing technique and the inclination and position of the straight line is calculated. Then, the bend angle of the workpiece W on the screen is calculated according to preset bend angle data.

Figure 7:
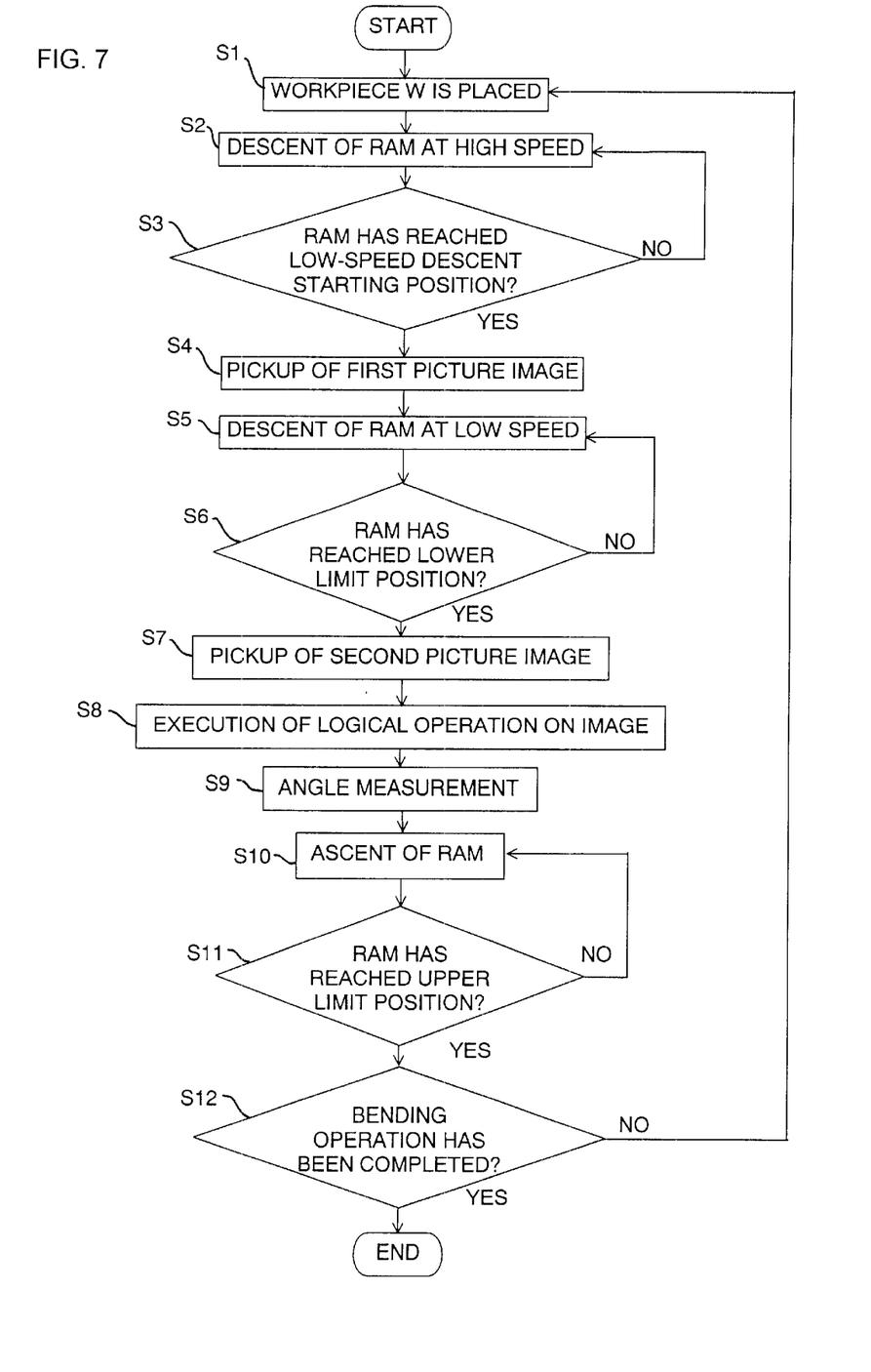
FIG. 7 is a flow chart of an operation of bending a workpiece according to the first embodiment.

Reference is made to the flow chart of FIG. 7 to describe a bending operation performed on the workpiece W.

Steps S1 to S3: First of all, the workpiece W is placed between the die 4 and the punch 7 and the drive units are put in operation in response to a command from the NC device 13 by means of the control device housed in the control panel 9. Descent of the ram 5 is started so that the ram 5 descends at high speed until the punch 7 arrives in the close vicinity of the workpiece W (that is, until the ram 5 reaches a low-speed descent starting position).

Steps S4 to S6: Upon arrival of the ram 5 at the low-speed descent starting position, the first picture image is picked up by the CCD cameras 15 and stored in the memory A. Then, the low-speed descent of the ram 5 is started. This low-speed descent continues until completion of bending of the workpiece W (that is, until the ram 5 reaches a lower limit position).

Step S7: Upon arrival of the ram 5 at the lower limit position, the second picture image is picked up by the CCD cameras 15 and stored in the memory B.

Step S8: The first picture image stored in the memory A and the second picture image stored in the memory B are input to the operation unit 16 and then respectively assigned to pixels arranged on X and Y coordinates. The pixels are divided into two groups according to whether each pixel is assigned either of the picture images. Subsequently, pixels having the same coordinate value in the first and second picture images are compared to each other to perform logical operation. In this way, only pixels (i.e., image c) which correspond to the projected light image formed on the workpiece W are extracted.

Step S9: The data on the image c is input to the NC device 13 to convert the image c into a straight line, the inclination and position of the straight line are obtained, and then the angle of a bend in the workpiece is calculated from the inclination and position according to preset bend angle data.

Step S10 to S12: After detection of the angle of the bend in the workpiece W, the ram 5 is raised by the drive units until it reaches an upper limit position. Accordingly, a series of operations for bending the workpiece W is completed. If bending is continued, Steps S1 to S11 are repeated.

According to the first embodiment, an image which moves during bending operation, that is, the picture image of a slit light projected onto the workpiece W (i.e., the object of measurement) alone can be extracted. Accordingly, images other than the image associated with the workpiece W (the object of measurement), which are within the view of each CCD camera 15, can be eliminated. Further, even if the surface of the workpiece is not flat, the image associated with the workpiece W can be accurately extracted and as a result, the angle of a bend in the workpiece W can be accurately detected.

Although the first picture image is picked up prior to bending of the workpiece W in the first embodiment, it may be picked up just before the punch 7 comes into contact with the workpiece W or picked up in a state in which the workpiece W is bent at the time the punch 7 has come into contact with the workpiece W. Referring to the flow chart of FIG. 7, the first picture image is picked up before low-speed descent is started upon arrival of the ram 5 at the low-speed descent starting position. However, the invention is not limited to this, and the first picture image may be picked up during the low-speed descent or high-speed descent of the ram 5 as long as it is picked up before the ram 5 arrives at the lower limit position.

FIGS. 5 and 6 are depicted with the concept that the slit light falls on the workpiece W, the backstop 8*a* and the die 4 and the light images formed on them are within the view of each CCD camera 15, but only the image formed on the workpiece W may be caught within the view of each CCD camera 15 in some cases depending on the positional relationship of the laser oscillators 14 and the CCD cameras 15. If this embodiment is applied to such a case, the same effects can be achieved.

(Second Embodiment)

There will be explained a bend angle detection process designed according to a second embodiment.

Basically, the system components (such as a press brake and image processing unit) of the second embodiment do not differ from those of the first embodiment. Therefore, an explanation on parts similar to those of the first embodiment will be omitted herein and parts inherent to the second embodiment will be mainly described.

The second embodiment is designed such that the first picture image is picked up by the CCD cameras 15 and stored in the memory A and after a specified time period (0.1 second in this embodiment) has elapsed after the pickup of the first picture image, the second picture image is picked up and stored in the memory B. The first and second picture images are repeatedly picked up until the ram 5 reaches its lower limit position.

Whenever the first and second picture images are picked up and stored in the memories A and B, they are input to the operation unit 16 in which logical operation is performed to create a new picture image (image c) and display it on the display unit 17, similarly to the first embodiment. The image C is the pixel image of the projected light image formed on the workpiece W at the time when the second picture image is picked up, so that the display unit 17 displays only the pixel image of the projected light image on the workpiece W which changes momentarily until the ram 5 arrives at the lower limit position.

Upon arrival of the ram 5 at the lower limit position, the data on the image c, which has been created from the second picture image picked up when the ram 5 has arrived at the lower limit position and the first picture image picked up just before that (0.1 second before the arrival of the ram at the lower limit position in this embodiment), is input to the NC device 13. The image data thus input is converted into a straight line with a known image processing technique and then the inclination and position of the straight line on the screen is calculated. Then, the angle of the bend in the workpiece W is obtained from the inclination and position of the straight line based on preset bend angle data.

Figure 8:
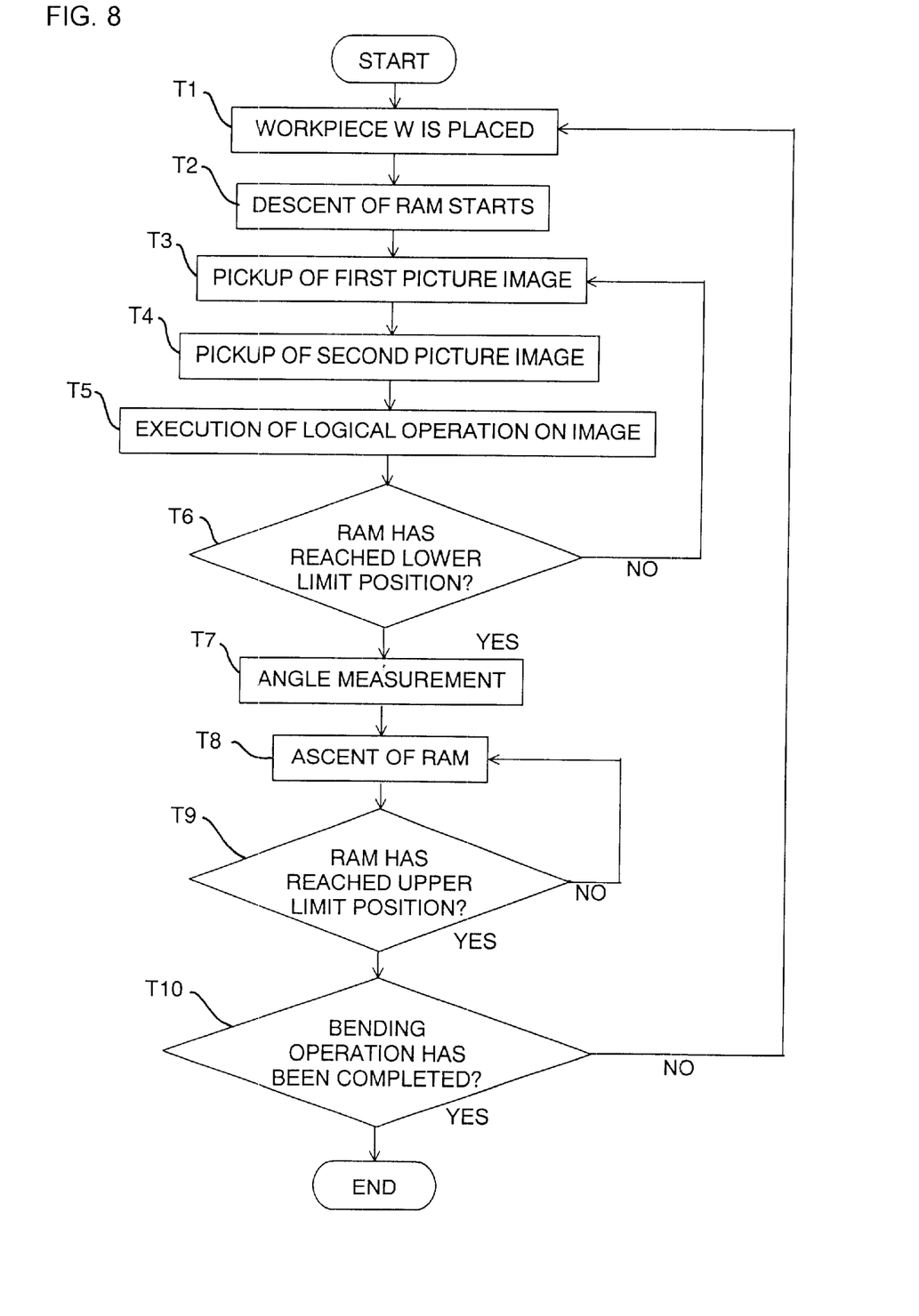
FIG. 8 is a flow chart of an operation of bending a workpiece according to a second embodiment of the invention.

Reference is now made to the flow chart of FIG. 8 to describe an operation for bending the workpiece W according to the second embodiment.

Steps T1 to T2: Firstly, the workpiece W is placed between the die 4 and the punch 7 and the drive units are put in operation by the control device within the control panel 9 in response to a command from the NC device 13, so that the ram 5 starts to descend.

Steps T3 to T6: The first picture image is picked up by the CCD cameras 15 and stored in the memory A. After a specified time period (0.1 second in this embodiment) has elapsed after the pickup of the first picture image, the second picture image is picked up to store in the memory B. These first and second picture images are input to the operation unit 16 and undergo logical operation, thereby creating the image c. The image c is then displayed on the display unit 17. The above series of operations is repeated until the ram 5 reaches the lower limit position.

Step T7: The above steps are repeated and data on the image c is input to the NC device 13, the image c being created from the second picture image picked up when the ram 5 has reached the lower limit position and the first picture image picked up just before that (0.1 second before the arrival of the ram at the lower limit position in this embodiment). The input image data is converted into a straight line by a known image processing technique and the inclination and position of the straight line on the screen is calculated. The angle of the bend in the workpiece is obtained from the inclination and position of the straight line according to preset bend angle data.

Steps T8 to T10: Similarly to the first embodiment, the ram 5 is raised to the upper limit position with the drive units after the detection of the bend angle of the workpiece W, so that a series of operations for bending the workpiece W is completed. If bending is continued, Steps T1 to T10 are repeated.

In the second embodiment, the time interval between the pickup of the first picture image and the pickup of the second picture image is arranged to be short, and if the die 4 slightly moves when the workpiece W is bent, the movement of the die 4 is slower than the movement of the workpiece W and therefore the die 4 is considered not to have moved on the basis of the above image pickup time interval. In consequence, a pixel image which corresponds to only the image of the projected light falling on the workpiece W can be accurately extracted. With this arrangement, the angle of a bend in the workpiece W can be more accurately detected.

While the time interval between the pickup of the first picture image and the pickup of the second picture image is set to 0.1 second in the second embodiment, this time interval may be shortened. With a shorter interval, an instant at which the punch 7 has come into contact with the workpiece W can be detected, without use of a sensor or the like.

While the first and second picture images are assigned to XY pixels and the pixels are divided into two groups according to whether each pixel is assigned either of the picture images in the forgoing embodiments, the pixels may be divided into two groups according to hue and brightness.

Although the foregoing embodiments have been described with the concept that a slit light is projected from laser oscillators onto a workpiece, the invention is not limited to this, but may be applied to a case where a series of spot lights is used.

What is claimed is:

1. A bend angle detection process in which a linear projected light image is produced on a surface of a workpiece, a picture image of the linear projected light image is picked up and subjected to image processing, thereby detecting the angle of a bend in the workpiece, the process comprising:
    (a) a first step of picking up a picture image of a first linear projected light image formed on a workpiece during bending of the workpiece;
    (b) a second step of picking up a picture image of a second linear projected light image formed on a workpiece after an elapse of a specified time period after picking up the picture image of the first linear projected light image;
    (c) a third step of assigning the respective picture images picked up at the first step and at the second step to pixels arranged within a common plane represented by X and Y coordinates and dividing said pixels into two groups according to hue and brightness;
    (d) a fourth step of creating a new picture image through a logical operation which is performed by making a comparison between each pixel associated with the picture image picked up at the first step and its corresponding pixel associated with the picture image picked up at the second step in the common plane represented by X and Y coordinates; and
    (e) a fifth step of calculating the angle of the bend from the new picture image created in the fourth step.

2. A bend angle detection process according to claim 1, wherein the picture images of the first linear projected light image and the second linear projected light image are repeatedly picked up at specified time intervals during bending of the workpiece and the new picture image is created each time the picture images of the first and second linear projected light images are picked up.

3. A bend angle detection system provided with a light projector means for projecting a light ray to produce a linear projected light image on a surface of a workpiece, and pickup means for picking up a picture image of the linear projected light image produced on the workpiece surface, the system further comprising:
    (a) a first memory for storing a picture image of a first linear projected light image formed on the surface of the workpiece by the light projector means during abending operation, said picture image being picked up by the pickup means and;

(b) a second memory for storing a picture image of a second linear projected light image formed on the surface of the workpiece, said picture image being picked up after a specified time period has elapsed after picking up the picture image of the first linear projected light image;

(c) a logical operation unit for respectively assigning the picture images of the first and second linear projected light images to pixels arranged in a common plane represented by X and Y coordinates, dividing said pixels into two groups according to hue and brightness, executing a logical operation by making a comparison between each pixel associated with the first linear projected light image and its corresponding pixel associated with the second linear projected light image, these pixels having the same coordinates in the common plane;

(d) a third memory for storing a new picture image which has been created by the logical operation performed in the logical operation unit; and (e) a bend angle computing unit for calculating the angle of a bend in the workpiece from the new picture image stored in the third memory.

4. A bend angle detection system according to claim 3, wherein the picture images of the first linear projected light image and the second linear projected light image are repeatedly picked up at specified time intervals during bending of the workpiece and the new picture image is created each time the picture images of the first and second linear projected light images are picked up.

5. A bend angle detection process in which a linear projected light image is produced on a surface of a workpiece, a picture image of the linear projected light image is picked up and subject to image processing, thereby detecting the angle of a bend in the workpiece, the process comprising:

(a) a first step of picking up a picture image of a first linear projected light image formed on a working piece prior to bending of the workpiece;

(b) a second step of picking up a picture image of a second linear projected light image formed on a working piece after completion of bending of the workpiece;

(c) a third step of assigning the respective picture images picked up at the first step and at the second step to pixels arranged within a common plane represented by X and Y coordinates and dividing said pixels into two groups according to hue and brightness;

(d) a fourth step of creating a new picture image through a logical operation which is performed by making a comparison between each pixel associated with the picture image picked up at the first step and its corresponding pixel associated with the picture image picked up at the second step in the common plane represented by X and Y coordinates; and (e) a fifth step of calculating the angle of the bend from the new picture image created in the fourth step.

6. A bend angle detection system provided with light projector means for projecting a light ray to produce a linear projected light image on a surface of a workpiece, and pickup means for picking up a picture image of the linear projected light image produced on the workpiece surface, the system further comprising:

(a) a first memory for storing a picture image of a first linear projected light image formed on the surface of a workpiece by the light projector means prior to a bending operation, said picture image being picked up by the pickup means and;

(b) a second memory for storing a picture image of a second linear projected light image formed on the surface of the workpiece, said picture image being picked up after completion of bending of the workpiece;

(c) a logical operation unit for respectively assigning the picture images of the first and second linear projected light images to pixels arranged in a common plane represented by X and Y coordinates, dividing said pixels into two groups according to hue and brightness, executing a logical operation by making a comparison between each pixel associated with the first linear projected light image and its corresponding pixel associated with the second linear projected light image, these pixels having the same coordinates in the common plane;

(d) a third memory for storing a new picture image which has been created by the logical operation performed in the logical operation unit; and (e) a bend angle computing unit for calculating the angle of a bend in the workpiece from the new picture image stored in the third memory.

* * * * *

UNITED STATES PATENT AND TRADEMARK OFFICE
CERTIFICATE OF CORRECTION

PATENT NO.  : 6,473,537 B1
DATED       : October 29, 2002
INVENTOR(S) : Yukihiro Yamada It is certified that error appears in the above-identified patent and that said Letters Patent is hereby corrected as shown below:

Title page,
Item [30], Foreign Application Priority Data, change "Feb. 7, 1998" to be -- July 2, 1998 --

Signed and Sealed this

Seventeenth Day of June, 2003

JAMES E. ROGAN
*Director of the United States Patent and Trademark Office*